United States Patent
Cheek et al.

(10) Patent No.: US 11,218,473 B2
(45) Date of Patent: Jan. 4, 2022

(54) SYSTEMS AND METHODS FOR IDENTIFYING SUSPICIOUS LOGINS

(71) Applicant: Capital One Services, LLC, McLean, VA (US)

(72) Inventors: Jackson Cheek, New York, NY (US); Zainab Zaki, Reston, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/675,250

(22) Filed: Nov. 6, 2019

(65) Prior Publication Data

US 2021/0136063 A1     May 6, 2021

(51) Int. Cl.
*H04L 29/06* (2006.01)
*G06Q 20/40* (2012.01)
*G06Q 20/38* (2012.01)

(52) U.S. Cl.
CPC ....... *H04L 63/0861* (2013.01); *G06Q 20/382* (2013.01); *G06Q 20/4016* (2013.01); *G06Q 20/40145* (2013.01); *H04L 63/0876* (2013.01); *H04L 63/108* (2013.01)

(58) Field of Classification Search
None
See application file for complete search history.

(56) References Cited

U.S. PATENT DOCUMENTS

| | | | | |
|---|---|---|---|---|
| 8,239,546 B1 * | 8/2012 | McGowan | ........ | H04L 29/08639 709/227 |
| 9,148,424 B1 * | 9/2015 | Yang | ........ | H04L 63/20 |
| 9,477,825 B1 * | 10/2016 | Sinchak | ........ | G06F 21/6218 |
| 9,491,155 B1 * | 11/2016 | Johansson | ........ | G06F 21/604 |
| 10,193,899 B1 * | 1/2019 | Shavell | ........ | H04W 12/12 |
| 2012/0192258 A1 * | 7/2012 | Spencer | ........ | H04W 12/003 726/7 |

(Continued)

OTHER PUBLICATIONS

Hossein Siadati, Bahador Saket, Nasir Memon—"Detecting Malicious Logins in Enterprise Networks Using Visulization"—2016—IEEE Symposium on visualization for cyber security (VISSEC) (Year: 2016).*

*Primary Examiner* — Arezoo Sherkat
(74) *Attorney, Agent, or Firm* — Hunton Andrews Kurth LLP

(57) ABSTRACT

A system for identifying suspicious logins. The system may include a memory storing executable instructions, and at least one processor configured to execute the instructions to perform operations. The operations may include receiving a first user login from an electronic device, the first user login comprising login credentials; receiving a second user login from an electronic device, the second user login comprising login credentials; analyzing a plurality of device history characteristics, wherein at least one device history characteristic comprises a determination of a last financial transaction performed by an electronic device; determining, based on the analysis, that the first and second user logins originate from different electronic devices; identifying, based on the determination and the analysis, the second user login as a suspicious login; sending, to a user, a notification of the identified suspicious login; and modifying, based on the notification, security settings on an account of the user.

19 Claims, 11 Drawing Sheets

(56) References Cited

U.S. PATENT DOCUMENTS

| | | | |
|---|---|---|---|
| 2014/0007182 A1* | 1/2014 | Qureshi | H04W 12/0806 |
| | | | 726/1 |
| 2015/0235275 A1* | 8/2015 | Shah | G06Q 30/0269 |
| | | | 705/14.66 |
| 2017/0161334 A1* | 6/2017 | Davis, III | G06F 16/24575 |
| 2017/0214679 A1* | 7/2017 | Lin | H04L 63/083 |
| 2017/0289813 A1* | 10/2017 | Pashkov | H04L 63/083 |
| 2018/0032722 A1* | 2/2018 | Carlson | G06F 21/44 |
| 2018/0032997 A1* | 2/2018 | Gordon | G06Q 30/0269 |
| 2018/0316704 A1* | 11/2018 | Durairaj | H04L 63/1425 |
| 2019/0213311 A1* | 7/2019 | Tussy | G06K 9/00288 |

* cited by examiner

SYSTEMS AND METHODS FOR IDENTIFYING SUSPICIOUS LOGINS

TECHNICAL FIELD

The present disclosure relates generally to systems and methods for identifying suspicious logins, and more particularly, identifying a suspicious login based on a determination that user logins originate from different electronic devices.

BACKGROUND

In many cases, Internet or web-based applications may include a device history database and a graphical user interface (GUI) that may display a plurality of stored user's login histories across multiple devices. This data may include, for example, information including device names, locations, timestamps, versions, biometric data, and/or other financial or transactional data relating to each device that is logged into the Internet or web-based applications. While device histories provide a layer of security and surveillance, many devices are still subject to security breaches and hacks from Internet thieves. For example, man-in-the-middle (MITM) attacks are common in which a fraudster spoofs the location and the configuration of a device making a fraudulent device appear like a legitimate device. These attacks comprise the security of user information and user access to Internet or web-based applications.

Therefore, techniques are needed that add protections for users logging into Internet or web-based applications across a plurality of client and/or mobile devices. For example, what is needed is a device "fingerprint" that is unique to a user that cannot be spoofed by a fraudster or hacker. Specifically, even if a user is looking at a particular login attempt that appears legitimate, what is needed is a device "fingerprint" that acts as a strong indicator that a user account has been compromised. Finally, techniques are needed that aggregate device history information, determine that user logins originate from different electronic devices, and modify security settings on an account of a user.

The disclosed systems and methods address one or more of the problems set forth above and/or other problems in the prior art.

SUMMARY

One aspect of the present disclosure is directed to a system for identifying suspicious logins. The system may include a memory storing executable instructions, and at least one processor configured to execute the instructions to perform operations. The operations may include receiving a first user login from an electronic device, the first user login comprising login credentials; receiving a second user login from an electronic device, the second user login comprising login credentials; analyzing a plurality of device history characteristics, wherein at least one device history characteristic comprises a determination of a last financial transaction performed by an electronic device; determining, based on the analysis, that the first and second user logins originate from different electronic devices; identifying, based on the determination and the analysis, the second user login as a suspicious login; sending, to a user, a notification of the identified suspicious login; and modifying, based on the notification, security settings on an account of the user.

Another aspect of the present disclosure is directed to a method for identifying suspicious logins. The method may include receiving a first user login from an electronic device, the first user login comprising login credentials; receiving a second user login from an electronic device, the second user login comprising login credentials; analyzing a plurality of device history characteristics, wherein at least one device history characteristic comprises a determination of a last financial transaction performed by an electronic device; determining, based on the analysis, that the first and second user logins originate from different electronic devices; identifying, based on the determination and the analysis, the second user login as a suspicious login; sending, to a user, a notification of the identified suspicious login; and modifying, based on the notification, security settings on an account of the user.

Yet another aspect of the present disclosure is directed to a non-transitory computer-readable medium storing instructions that, when executed by a processor, cause the processor to perform operations for identifying suspicious logins. The operations may include receiving a first user login from an electronic device, the first user login comprising login credentials; receiving a second user login from an electronic device, the second user login comprising login credentials; analyzing a plurality of device history characteristics, wherein at least one device history characteristic comprises a determination of a last financial transaction performed by an electronic device; determining, based on the analysis, that the first and second user logins originate from different electronic devices; identifying, based on the determination and the analysis, the second user login as a suspicious login; sending, to a user, a notification of the identified suspicious login; and modifying, based on the notification, security settings on an account of the user.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 8 depicts a graphical user interface, consistent with disclosed embodiments.

DETAILED DESCRIPTION

Reference will now be made in detail to the disclosed embodiments, examples of which are illustrated in the accompanying drawings.

Figure 1:
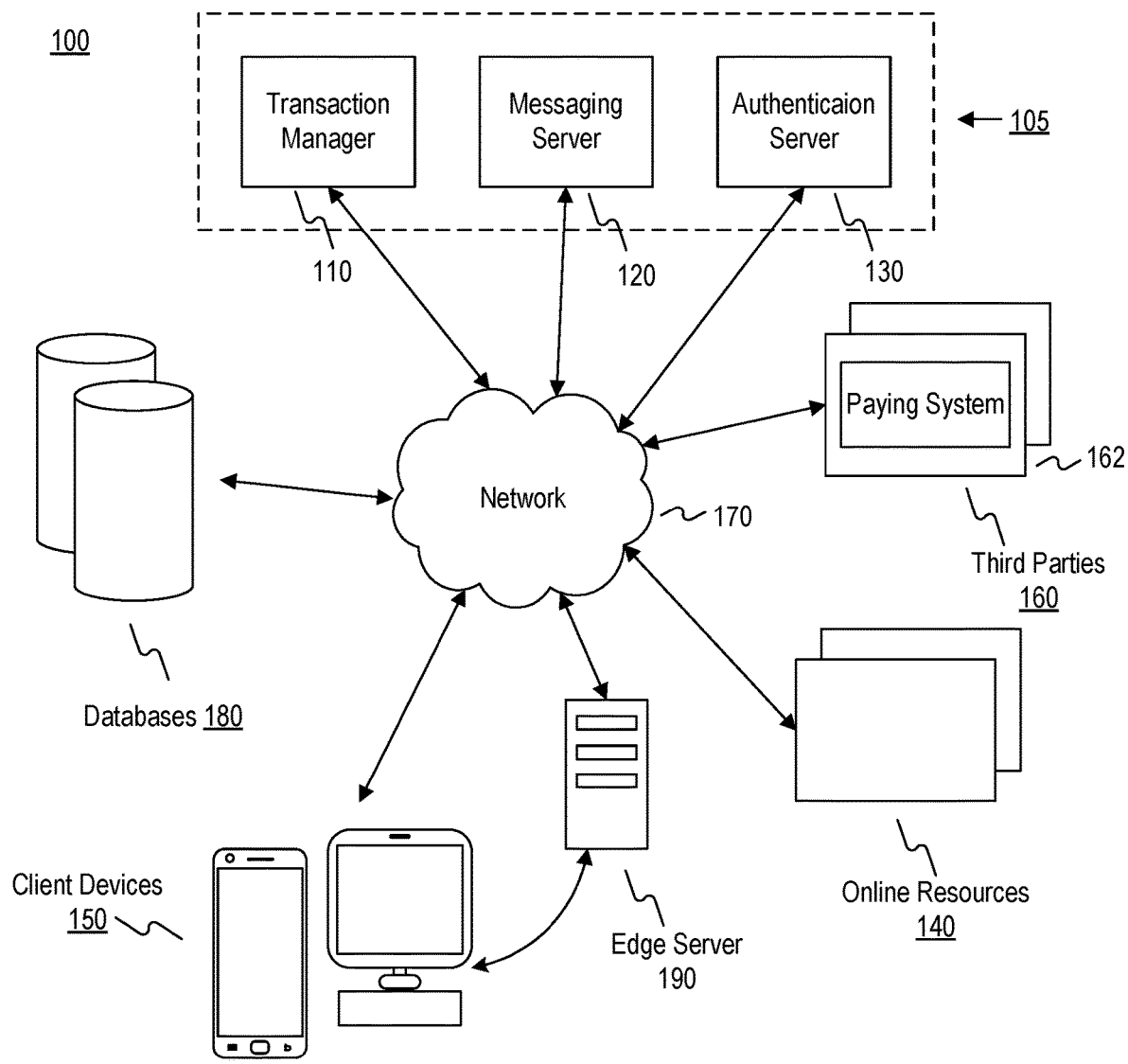
FIG. 1 is a block diagram of an exemplary system, consistent with disclosed embodiments.

FIG. 1 is a block diagram of an exemplary system 100, consistent with the disclosed embodiments. In system 100, a service provider, such as a bank, may interact with clients using multiple communication channels such as push notifications, emails, and short message service (SMS). System 100 may include a service system 105, which may include a transaction manager 110, a messaging server 120, and an authentication server 130. System 100 may additionally include online resources 140, client devices 150, third-party systems 160, databases 180, and an edge server 190. In some embodiments, as shown in FIG. 1, components of system 100 may be connected to a network 170. However, in other embodiments, components of system 100 may be connected directly with each other without network 170. For example, edge server 190 may be directly coupled to client devices 150, as indicated by the broken line connecting edge server 190 to client devices 150.

Online resources 140 may include one or more servers or storage services provided by an entity, such as a provider of website hosting, networking, cloud, or backup services. In some embodiments, online resources 140 may be associated with hosting services or servers that store user accounts and/or credit card information. In other embodiments, online resources 140 may be associated with a cloud computing service such as Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as completion messages and notifications. In such embodiments, online resources 140 may handle the delivery of messages and notifications related to functions of the disclosed embodiments, such as device history authentication and login and electronic device credential comparison for logging into a financial account, such as a bank account.

Client devices 150 may include one or more computing devices configured to perform one or more operations consistent with the disclosed embodiments. For example, client devices 150 may include a desktop computer, a laptop computer, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may include software that, when executed by a processor, performs Internet-related communication (e.g., Transmission Control Protocol/Internet Protocol (TCP/IP)) and content display processes. For instance, client devices 150 may execute browser software that generates and displays interfaces including content on a display device included in, or connected to, client devices 150.

Client devices 150 may execute applications that allow client devices 150 to communicate with components over network 170, and generate and display content in interfaces via display devices included in client devices 150. The display devices may be configured to display graphical user interfaces. The disclosed embodiments are not limited to any particular configuration of client devices 150. For instance, a client device 150 may be a mobile device that stores and executes mobile applications to perform operations that provide functions offered by service system 105 and/or online resources 140. In certain embodiments, client devices 150 may be configured to execute software instructions relating to location services, such as GPS. For example, client devices 150 may be configured to determine a geographic location and provide location data and time stamp data corresponding to the location data. Client devices 150 are further described in connection with FIG. 6.

Third-party systems 160 may include one or more entities that provide goods, services, and/or information, such as a retailer (e.g., Macy's™, Target™, etc.), an entertainment venue (e.g., cinema, theater, museum, etc.), a service provider (e.g., utility company, etc.), a restaurant, a bar, a non-profit organization (e.g., ACLU™, AARP™, etc.), or other type of entity that provides goods, services, and/or information that consumers (e.g., end users or other business entities) may purchase, consume, use, etc. Third-party systems 160 are not limited to entities associated with any particular business, specific industry, or distinct field.

Third-party systems 160 may include one or more computing systems, such as servers, that are configured to execute stored software instructions to perform operations associated with a merchant, including one or more processes associated with processing purchase transactions, generating transaction data, generating product data (e.g., stock keeping unit (SKU) data) relating to purchase transactions, etc.

In some embodiments, third-party systems 160 may be brick-and-mortar locations that a consumer may physically visit and purchase goods and services. Such physical locations may include a paying system 162, which may include computing devices that perform financial service transactions with consumers (e.g., point-of-sale (POS) terminal(s), kiosks, etc.). Paying system 162 may include one or more computing devices configured to perform operations consistent with facilitating purchases at third-party systems 160. Paying system 162 may also include back- and/or front-end computing components that store data and execute software instructions to perform operations consistent with disclosed embodiments, such as computers that are operated by employees of the third party (e.g., back office systems, etc.).

While paying system 162 is shown within a third-party system 160 in FIG. 1, in some embodiments, paying system 162 may be separated from third-party systems 160. For example, paying system 162 may be a different entity that services third-party systems 160. In such embodiments, third-party systems 160 may provide goods and/or services via online solutions. Third-party systems 160 may sell goods via a website to market, sell, and process online transactions. Then, paying system 162 may provide an infrastructure for online payments.

In some embodiments, paying system 162 may include a POS terminal. In particular, a financial card purchase may be carried out by presenting a financial card at a POS terminal. Data associated with the financial card may be provided to a payment processor, and the payment processor may process a payment for the purchase. For example, the payment processor may generate a credit card authorization and include a time stamp and information about the merchant.

For purchases, paying system 162 may collect and/or maintain data identifying the financial card that has been used to make the purchases at a third-party system 160. Additionally, paying system 162 may collect and/or maintain data identifying a user associated with the financial card and/or data identifying a date on which the purchase was made. Paying system 162 may collect and/or maintain other data as well. Data collected and/or maintained by paying system 162 may be provided to databases 180 or service system 105.

In some embodiments, paying system 162 may include a device configured to collect credit card information and issue credit card authorizations. For example, paying system 162 may include magnetic stripe or chip readers that collect credit card information and connect with a credit card network. In such embodiments, paying system 162 may include software to append information to the credit card authorization or issue new notifications. For example, paying system 162 may include a program to flag a credit card authorization, append a time stamp based on a location code (e.g., ZIP Code™, and specify the merchant's address. In some embodiments, to simplify the collection of data, paying system 162 may also be connected to databases 180. In such embodiments, paying system 162 may include a communication device that sends information to service system 105 (e.g., an acquirer bank) and databases 180.

Databases 180 may include one or more computing devices configured with appropriate software to perform operations consistent with providing service system 105, messaging server 120, and authentication server 130 with data for performing transactions with client devices 150 and third-party systems 160. Databases 180 may include, for example, Oracle™ databases, Sybase™ databases, or other relational databases or non-relational databases, such as Hadoop™ sequence files, HBase™, or Cassandra™. Databases 180 may include computing components (e.g., a database management system, database server, etc.) configured to receive and process requests for data stored in memory devices of the database(s) 180 and to provide data from the database(s) 180.

While databases 180 are shown separately, in some embodiments, databases 180 may be included in, or otherwise related to, one or more of service system 105, transaction manager 110, messaging server 120, authentication server 130, and online resources 140.

Databases 180 may be configured to collect and/or maintain the data associated with user accounts and user preferences. Databases 180 may collect the data from a variety of sources, including, for instance, online resources 140. Databases 180 are further described below in connection with FIG. 5.

Transaction manager 110 may include one or more computing systems configured to perform operations consistent with handling transaction requests from client devices 150 and third-party systems 160. In some embodiments, transaction manager 110 may receive requests to execute a transaction from a third party, perform operations to determine if the transaction may be authorized (e.g., determine if an account has sufficient funds), and communicate authorizations to third-party systems 160 and/or client devices 150. In some embodiments, transaction manager 110 may provide infrastructure and components to access financial service accounts, such as credit card accounts, checking accounts, debit card accounts, loyalty or reward programs, lines of credit, and the like. In such embodiments, transaction manager 110 may authorize or decline credit card authorization requests and may issue authorization codes. Further, transaction manager 110 may include databases that store user accounts and link them to user preferences or settings to decide whether or not to authorize a transaction.

In some embodiments, as a response to transaction notifications from third-party systems 160 or client devices 150, transaction manager 110 may correlate information in the transaction notification with a user account. Having identified a user account based on information from the transaction, transaction manager 110 may determine the types of response actions available. For example, when transaction manager 110 receives a transaction notification indicating that a user is attempting to use a blocked credit card, transaction manager 110 may correlate the transaction notification with a user account to determine if the user has enrolled in push notification, email, or SMS messages to notify the user that a transaction was declined.

Messaging server 120 may include one or more computing systems configured to generate and transmit notifications to client devices 150. For example, messaging server 120 may include computing systems to encode messages and interact with messaging servers, such as Apple Push Notification Service (APNS) or Google Cloud Messaging (GCM). For example, in some embodiments, messaging server 120 may include processors to encode a message based on instructions received from transaction manager 110. The message may be configured as a push notification, as an email, or as an SMS. Depending on the type of message that is generated, messaging server 120 may then elect a communication path to transmit the messages.

In some embodiments, messaging server 120 may also be configured to receive messages from other elements of system 100. For example, messaging server 120 may be configured to receive and interpret messages from edge server 190. Further, messaging server 120 may include middleware programs that handle communications from other elements of system 100 using a messaging application program interface (API). In such embodiments, messaging server 120 may implement queue and prioritization programs to process or deliver messages. Further, messaging server 120 may be configured to save messages, generate records, or respond with acknowledgement messages for different communication protocols. For example, messaging server 120 may be configurable to communicate with other elements of system 100 using cellular networks that use standards such as Long-Term Evolution (LTE) and Global System for Mobile communications (GSM). In addition, server 120 may also implement communication protocols such as TCP/IP (Transmission Control Protocol/Internet Protocol), ARP (Address Resolution Protocol), DHCP (Dynamic Host Configuration Protocol), DNS (Domain Name System), and FTP (File Transfer Protocol), among others, to interact with other elements of system 100.

Messaging sever 120 may be organized as a point-to-point messaging. Alternatively, or additionally, messaging server 120 may be configured as a subscribe/publish messaging server. In both embodiments, nonetheless, messaging server 120 may include processors to encode and decode data to generate Uniform Resource Identifiers (URIs). For example, messaging server 120 may generate URIs by producing standardized file paths, and encode data files in standard formats, such as base64. In such embodiments, messaging server 120 may configure the URI as Cascading Style Sheet (CSS) files to reduce the number of Hypertext Transfer Protocol (HTTP) requests for the external resources. URIs generated by messaging server 120 may include parameters such as an API version, an account name, a client ID, an action ID, and/or a subscription ID. For example, messaging sever 120 may be configured to encode in the URI a unique ID that includes interactive session identification and a request or action ID, which may specify available actions as determined by, for example, transaction manager 110.

Messaging server 120 may be configured to communicate with other elements of system 100 by invoking specified APIs. For example, messaging server 120 may communicate with notification services, such as APNS, using a dispatching API. In such embodiments, messaging server 120 may use the dispatching API to construct a JavaScript Object Notation (JSON) dictionary containing the notification's payload, generate a unique device token, and other delivery information in an HTTP request. Moreover, messaging server 120 may be configurable to invoke decoding APIs that interpret messages from other elements of system 100. For example, messaging server 120 may be configurable to handle HTTP GET and/or PUT requests.

Moreover, messaging server 120 may handle exchanges for secure communication with services such as GCM. For example, messaging server 120 may handle token-based provider connection and use an HTTP/2-based API to generate web tokens and provide validation credentials for connection with broadcasting or dispatching servers. In such embodiments, messaging server 120 may generate and control public keys and private keys for exchanges with authentication or notification servers. Further, messaging server 120 may provide push notification requests and receive results as an HTTP response. In some embodiments, the response may include details on success or failure of delivery. In other embodiments, messaging sever 120 may establish secure communication pathways with notification service providers. For example, messaging server 120 may employ a unique provider certificate and a private cryptographic key. In such embodiments, messaging server 120 may receive a provider certificate that may establish a push notification service identification. Messaging server 120 is further described below in connection with FIG. 3.

Authentication server 130 may include one or more computing systems that perform operations to authenticate client devices 150, users of client devices 150, and/or third-party systems 160. For example, authentication server 130 may be implemented with a computer system having a processor that determines if credentials produced by client devices 150 are valid. Further, authentication server 130 may also be programmed to identify fraudulent transactions and generate further alerts that may be communicated to other elements of system 100. For example, authentication server 130 may identify repeated authentication attempts directed to a user account and transmit an alert message to transaction manager 110.

In some embodiments, authentication server 130 may be implemented as a dedicated computer. In other embodiments, authentication server 130 may be part of an ethernet switch, an access point, a network access server, or combinations thereof. Authentication server 130 may receive access requests from client devices 150 and grant access based on a username and password match or other identifying information, such as biometric information. In some embodiments, authentication server 130 may employ encrypted systems such as Kerberos. Alternatively, or additionally, authentication server 130 may use security tokens that can be used for specified operations. In such embodiments, authentication server 130 may utilize tokens associated with client devices 150 to grant different levels of access to a user account. For example, authentication server 130 may grant a first token to access information about the reason for declining a credit card transaction, issue a different token to grant write changes for unlocking the credit card, and issue yet another token to communicate an approval to third-party systems 160. Authentication server 130 may communicate with other elements of system 100 using User Datagram Protocol (UDP) channels employing methods such as RADIUS (Remote Authentication Dial-In User Service). Alternatively, or additionally, authentication server 130 may employ TCP/IP communications in methods such as TACACS+ (Terminal Access Controller Access Control System Plus). Further, in some embodiments, authentication server 130 may determine whether a device-based authentication was performed. Alternatively, or additionally, authentication server 130 may authenticate a device using device information. For example, authentication server 130 may use media access control (MAC) or IP addresses to authenticate client devices 150 and/or third-party systems 160, without the need of exchanging passwords and authentication requests. Moreover, authentication server 130 may use smart cards or biometric verification in addition to one or more of the above-mentioned technologies.

FIG. 1 shows transaction manager 110, messaging server 120, and authentication server 130 as different components of service system 105. However, transaction manager 110, messaging server 120, and authentication server 130 may be implemented in the same computing system. For example, all elements in service system 105 may be embodied in a single server.

Edge server 190 may include one or more computing systems that perform operations to relay communications between networks associated with system 100. For example, edge server 190 may be coupled between local networks of system 100, or between a private network of service system 105 and a general and public cellular network. In some embodiments, as shown in FIG. 1, edge server 190 may be located close to client devices 150 to minimize lag time between interactions. Further, edge server 190 may be programmed to resolve acknowledgement responses or perform basic authentication tasks after receiving responses from client devices 150.

In some embodiments, edge server 190 may implement a firewall that monitors traffic coming in from client devices 150 or third-party systems 160, and identify any dangerous or suspicious behavior to block a response. For example, edge server 190 may identify responses with tampered URIs and block those responses to prevent unintended or fraudulent unlocking requests. Further, edge server 190 may perform Domain Name System (DNS) functions and manage communication gateways to balance front-end web servers and back-end data. Moreover, edge server 190 may perform gateway functions and forward incoming messages to the internal/private servers. For example, edge server 190 may be configured to invoke APIs and interact with transaction manager 110. In addition, edge server 190 may be part of a Content Distribution Network (CDN) and store static content and replicate other server functions, but being closer to the end user to minimize processing times. Edge server 190 is further described in connection with FIG. 7.

Network 170 may be any type of network configured to provide communications between components of system 100. For example, network 170 may be any type of network (including infrastructure) that provides communications, exchanges information, and/or facilitates the exchange of information, such as the Internet, a Local Area Network, a near field communication (NFC) system, or other suitable connection(s) that enables the sending and receiving of information between the components of system 100. In other embodiments, one or more components of system 100 may communicate directly through a dedicated communication link(s).

Figure 2:
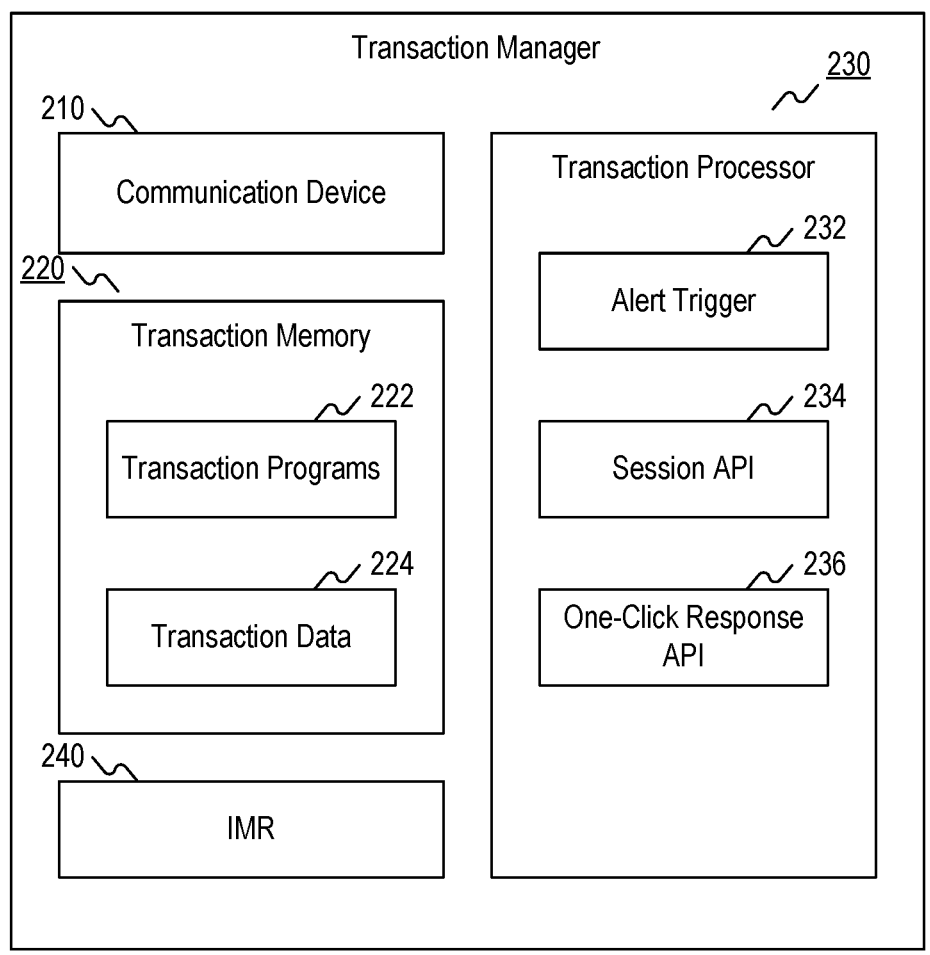
FIG. 2 is a block diagram of an exemplary transaction manager, consistent with disclosed embodiments.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

FIG. 2 shows a block diagram of an exemplary transaction manager 110 (FIG. 1), consistent with disclosed embodiments. Transaction manager 110 may include a communication device 210, a transaction memory 220, and one or more transaction processors 230, and an implementation repository (IMR) 240. Transaction memory 220 may include transaction programs 222 and transaction data 224. Transaction processors 230 may include an alert trigger module 232, a session API module 234, and a one-click response API 236.

In some embodiments, transaction manager 110 may take the form of a server, a general-purpose computer, a mainframe computer, or any combination of these components. In other embodiments, transaction manager 110 may be a virtual machine. Other implementations consistent with the disclosed embodiments are possible as well.

Communication device 210 may be configured to communicate with one or more databases, such as databases 180 described above, either directly or via network 170 (FIG. 1). In particular, communication device 210 may be configured to receive user account information from databases 180 to determine whether or not to process a transaction. In addition, communication device 210 may be configured to communicate with other components as well, including, for example, messaging server 120 and authentication server 130. For example, messaging server 120 may communicate a client response to transaction manager 110, or transaction manager 110 may communicate available actions to messaging server 120 to generate push notifications, emails, or SMS.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Transaction memory 220 may include one or more storage devices configured to store instructions used by transaction processors 230 to perform functions related to disclosed embodiments. For example, transaction memory 220 may store software instructions, such as transaction programs 222, that may perform operations when executed by transaction processors 230. The disclosed embodiments are not limited to separate programs or computers configured to perform dedicated tasks. For example, transaction memory 220 may include a single transaction program 222 that performs the functions of transaction manager 110, or transaction program 222 may include multiple programs. Transaction memory 220 may also store transaction data 224 that is used by transaction program 222. For example, transaction data 224 may include logs of transaction notifications from third-party systems 160, and transaction processors 230 may use this information to determine whether or not to execute the transaction.

In certain embodiments, transaction memory 220 may store sets of instructions for carrying out processes to determine whether a transaction should be processed, identify locked accounts, and/or interact with user accounts. In certain embodiments, transaction memory 220 may store sets of instructions for requesting information from a financial service and request authorizations for processing transactions. Other instructions are possible as well. In general, instructions may be executed by transaction processors 230 to perform processes consistent with the disclosed embodiments.

In some embodiments, transaction processors 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, transaction processors 230 may be a plurality of devices coupled and configured to perform functions consistent with the disclosure. For example, transaction processors 230 may include a plurality of co-processors, each configured to run specific transaction manager 110 operations such as floating point arithmetic, graphics, signal processing, string processing, cryptography, or input/output (I/O) interfacing.

In some embodiments, transaction processors 230 may execute software to perform functions associated with each component of transaction processors 230. In other embodiments, each component of transaction processor 230 may be an independent device. In such embodiments, each component may be a hardware device configured to specifically process data or perform operations of processing transactions. For example, alert trigger module 232 may be a field-programmable gate array (FPGA), while session API module 234 may be a central processing unit (CPU). Other hardware combinations are also possible. In yet other embodiments, combinations of hardware and software may be used to implement transaction processors 230.

Alert trigger module 232 may process transaction notifications to determine whether an alert should be generated. For example, communication device 210 may receive a transaction notification from one of third-party systems 160. Alert trigger module 232 may identify inconsistencies with the transaction notification and generate an alert for the system to prevent the transaction or request an authorization. For example, alert trigger module 232 may generate an alert when the transaction notification is from an unexpected foreign country. Alternatively, or additionally, alert trigger module 232 may generate an alert when a credit card associated with the transaction is locked, inactive, or has insufficient funds/credit. In such embodiments, alert trigger module 232 may fetch user information to make those determinations. For example, alert trigger module 232 may identify user(s) associated with the received transaction notification and request user information from transaction data 224. In some embodiments, alert trigger module 232 may be generated using Structured Query Language (SQL) alert functions based on an application log. For example, alert trigger module 232 may employ an SQL server agent that reads the application log and compares events written there to defined alerts. In such embodiments, when the SQL server agent finds a match, the agent may automatically issue an alert. Further, alert trigger module 232 may monitor performance conditions of transaction processors 230.

In some embodiments, transaction processors 230 may implement alert trigger module 232 by executing instructions to create an application in which transaction notifications are processed. In other embodiments, however, alert trigger module 232 may be a separate hardware device or group of devices configured to carry out operations. For example, to improve performance and speed of the transaction notification processing, alert trigger module 232 may be an SRAM-based FPGA that functions as alert trigger module 232. Further, alert trigger module 232 may have an architecture designed for implementation of specific algorithms.

In such embodiments, alert trigger module 232 may include a Simple Risc Computer (SRC) architecture or other reconfigurable computing system.

Session API module 234 may include a set of functions that generate core session workings, allowing data to be stored and associated with a user account. Session API module 234 may create user sessions with banking systems using defined realms, such as Lightweight Directory Access Protocol (LDAP). In such embodiments, session API module 234 may save session information with cookie files that can be re-used for subsequent requests. In some embodiments, session API module 234 may be configured to time out after a predetermined number of minutes of no activity. Alternatively, session API module 234 may be configured to time out after more hours or after receiving a subsequent response. For example, transaction processors 230 may be configured to disconnect after eight hours or when third-party systems 160 transmit a confirmation.

In some embodiments, session API module 234 may generate requests by configuring directory paths such as "/api/session?realmName=<realmName>," where the query parameter realmName takes as its value the name of a realm to authenticate against. In such embodiments, session API module 234 may return a cookie ID in the HTTP response header. Session API module 234 may also store the cookie ID and the HTTP response in a file to be used in subsequent requests.

In some embodiments, based on the indication of an event from alert trigger module 232, session API module 234 may establish sessions to access user-specific information associated with a user account. For example, session API module 234 may communicate with databases 180 using an implementation repository (IMR) 240 to request user-specific information associated with a user account.

One-click response API 236 may include a set of instructions for providing one-click access to a customized user interaction-specific web page associated with a user account. One-click response API 236 may use a unique identifier associated with an interactive session and generate a web URL for the one-click interaction. In such embodiments, one-click response API 236 may generate a customized user interaction-specific web page. For example, in some embodiments, once an alert is generated by alert trigger module 232 and a session is established by session API module 234, one-click response API 236 may be used to request changes in a user account or provide instructions on how to resolve issues. Moreover, in some embodiments, the unique ID may be related to an opened interactive session.

In some embodiments, one-click response API 236 may be configured to decode URIs to identify message, content, error templates, and action requests. For example, from a URI, one-click response API 236 may be configured to identify a user identification and a request for updating the user account. In such embodiments, one-click response API 236 may identify a credit card number, associate it with a user account, and identify a request to unlock the credit from a URI. One-click response API 236 may also be used to communicate with other elements of system 100 to update the user account and authorize or decline transactions, and/or activate credit cards.

In some embodiments, one-click response API 236 may generate scripts to execute the actions identified from the URI. For example, one-click response API 236 may configure JavaScript Object Notation scripts such as:

```
<script type="application/ld+json">
{
    "@context": "http://schema.org",
    "@type": "EmailMessage",
    "potentialAction": {
        "@type": "HttpActionHandler",
        "address": ActionAddress
    }
    "description": "$descript"
}</script>
```

Alternatively, or additionally, one-click response API 236 may generate microdata routines to execute instructions from the URI. For example, one-click response API 236 may configure actions based on an action ID from the URI by generating schema template instructions such as:

```
<div itemscope itemtype="http://schema.org/Message">
  <div itemprop="potentialAction" itemscope
itemtype="http://schema.org/ConfirmAction">
    <meta itemprop="name" content="Approve Expense"/>
    <div itemprop="handler" itemscope
itemtype="http://schema.org/HttpActionHandler">
      <link itemprop= action address/>
  </div>
```

In some embodiments, one-click response API 236 may use communication device 210 to transmit instructions to other elements of system 100. In other embodiments, however, one-click response API 236 may execute instructions to perform peer-to-peer communication without routing it through communication device 210.

One-click response API 236 may be implemented by transaction processors 230. For example, transaction processors 230 may execute software to create an environment to execute the one-click operations. However, in other embodiments, one-click response API 236 may be performed by hardware devices configured to carry out parallel operations. Some hardware configurations may improve the efficiency of the interactions between transaction manager 110 and other elements of system 100, particularly when multiple transactions are being processed in parallel. For example, one-click response API 236 may call multicore processors or computer clusters to divide tasks and quickly process transactions.

IMR 240 may include processors and/or storage devices that maintain a server table to keep track of pending processes. Alternatively, or additionally, IMR 240 may run on an embedded device and may record server details in non-volatile RAM. IMR 240 may control a registry of known servers, and records which server is currently running on which host and at which port number. IMR 240 may also start servers on demand if they are registered to do so. In some embodiments, IMR 240 may manage the work flow between servers by creating a persistent reference, set the address and port number in the profile body of the Interoperable Object Reference (IOR), which may uniquely identify an object on a remote server, and implement a repository that is responsible for the server. In such embodiments, when a client uses an 1OR, IMR 240 may connect the client to the implementation repository, provided the implementation repository is not down. Further, IMR 240 may be configured to decode IORs and use a Portable Object Adapter (POA) name from the object key to index into the server table. The repository replies with the current addressing information of the actual server.

In some embodiments, IMR 240 may store the information about each server application. For example, for each server application, IMR 240 may store a logical name that uniquely identifies a server (e.g., "BankSrv" or "StockControlSrv"), a command that IMR 240 can execute to (re)start the server process, and status information that indicates whether or not the server is currently running. With this diversified configuration of server processes, IMR 240 may be configured to start and stop a server process, record details of servers (such as the command used to launch a server), and determine whether or not the server is currently running. In some embodiments, IMR 240 may store this information in transaction memory 220 and/or database 180. Alternatively, or additionally, IMR 240 may record this information in a textual file.

The components of transaction manager 110 may be implemented in hardware, software, or a combination of both. For example, although one or more components of transaction manager 110 may be implemented as computer processing instructions embodied in computer software, all or a portion of the functionality of transaction manager 110 may be implemented in dedicated hardware. For instance, groups of GPUs and/or FPGAs may be used to quickly analyze data in transaction processors 230.

Figure 3:
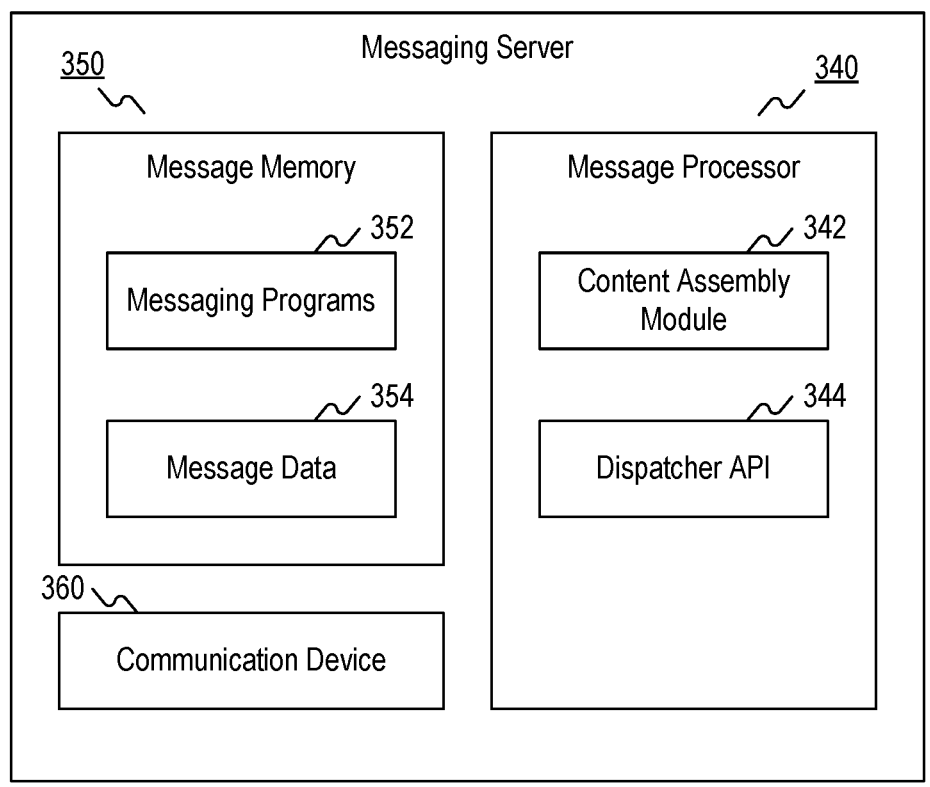
FIG. 3 is a block diagram of an exemplary messaging server, consistent with disclosed embodiments.

Referring now to FIG. 3, there is shown a block diagram of an exemplary messaging server 120 (FIG. 1), consistent with the disclosed embodiments. Messaging server 120 may include a message processor 340, a message memory 350, and a communication device 360.

Message processor 340 may be embodied as a processor similar to transaction processors 230. Message processor 340 may include a content assembly module 342 and a dispatcher API 344.

Content assembly module 342 may generate a message for transmission to client devices 150. In some embodiments, content assembly module 342 may generate interactive or enhanced push notifications for client devices 150. For example, based on determinations of transaction manager 110 and an identified user, content assembly module 342 may retrieve a message template including, for example, a header and a payload, and populate the template with the specific information for a selected action and a selected user. For example, content assembly module 342 may be configured to populate the payload for a notification using a JSON dictionary. In such embodiments, content assembly module 342 may communicate with software applications that include a dictionary containing one or more additional defined keys. Further, content assembly module 342 may include keys for instructing client devices 150 to display an alert, play a sound, or badge an app icon. Alternatively, or additionally, content assembly module 342 may include keys for silent notifications.

In some embodiments, content assembly module 342 may include custom "keys" within the payload to deliver data to client devices, notify service app extensions, or notify content app extensions. In such embodiments, custom keys in content assembly module 342 may have values with primitive types, such as dictionary, array, string, number, or Boolean. Custom keys may be placed in, for example, the "userInfo" dictionary of an "UNNotificationContent" object delivered to client devices 150. Content assembly module 342 may generate identifier strings that encode app-specific data. For example, content assembly module 342 may generate a URI that encodes a message, a requested action, and an identifier for an interactive session with, for example, IMR 240.

In some embodiments, the interactive session may be established to provide communication between service system 105, client devices 150, and third-party systems 160. For example, the interactive session may open communication ports for TCP/IP. In some embodiments, the interactive session may include an activity log configured to store communications and data to and from the user device in association with a subject of the notification. In such embodiments, the activity log may be stored in databases 180.

Moreover, establishing an interactive session may include permitting the client of the communication to log into the system. For example, the client may present identification credentials. The type of credentials may depend on the operating system. In some embodiments, credentials may include a username and a text password. Alternatively, or additionally, the authentication to establish an interactive session between service system 105 and other elements of system 100 may include Kerberos, Secure Shell (SSH), or security certificates.

In some embodiments, establishing an interactive session may include defining parameters and headers such as determining {cluster-endpoint} with the URL of the cluster's management endpoint and {session-id} with the session id returned on session startup, setting the content-type header to application/json, and authenticating with the endpoint using HTTP basic authentication. An example of creating an interactive session, which may later be codified with a unique ID, is:

```
"kind" : "spark",
"jars" :
["wasb://<BlobStorageContainerName>@<StorageAccountName>. "],
"files" :
["wasb://<BlobStorageContainerName>@<StorageAccountName>. "],
"driverMemory" : "1G",
"driverCores" : 2,
"executorMemory" : "1G",
"executorCores" : 10,
"num Executors" : 10.
```

Content assembly module 342 may then add the formed string to a message payload. Further, content assembly module 342 may categorize messages that identify the notification's type and add action buttons to the alert. For example, content assembly module 342 may generate messages with a play action to start a request using a custom action ID. The custom action ID may contain an identifier that the mobile app can use to request user interaction and perform instructions related to the user account.

In some embodiments, content assembly module 342 may be configured to generate, in a first instance, push notification messages. Then, if the push notification is unsuccessful, content assembly module 342 may generate an SMS and/or an email message, which includes similar information as the push notification. For example, if client devices 150 cannot receive push notifications because they do not have notification features activated, content assembly module 342 may be instructed to generate SMS and/or email messages with similar information. In other embodiments, however, content assembly module 342 may be configured to generate the push notification concurrently with an SMS and an email. For example, content assembly module 342 may generate a URI encoding a unique ID and action ID, and then generate a push notification payload, an email, and an SMS that includes the URI. In such embodiments, content assembly module 342 invokes email APIs that manage rich content and handle volume requests. Further, content assembly module 342 may also store and encode infrastructure rules, such as various Internet service provider requirements.

Dispatcher API 344 may interface with communication services such as APNS or GCM. Further, dispatcher API 344 may offer automation of creating contacts, sending SMS messages, and/or emails. Dispatcher API 344 may generate JSON files for these various events, and may include some automated responses to transmit generated messages by, for example, content assembly module 342. In some embodiments, dispatcher API 344 may create persistent socket connections with notification services. The socket connections may be tuned using a Java Naming and Directory Interface (JNDI) property such as "push.apns.connections." In some embodiments, dispatcher API 344 may be configured to close sockets if there is an extended idle time using instructions such as "push.apns.connectionIdleTimeout."

Dispatcher API 344 may also manage interaction with firewalls from notification services. For example, after receiving a message from content assembly module 342, dispatcher API 344 may create connections (as defined in the JNDI or by default) and send remote notifications over these connections. If the notification service has firewall settings configured to close idle socket connections, then it can use the JNDI properties to close the sockets before the firewall terminates them.

In some embodiments, dispatcher API 344 may encrypt the data before sending it to prevent MITM attacks. Further, dispatcher API 344 may perform operations to call and queue messages. For example, dispatcher API 344 may locally store messages when a client is unavailable and release them when the client comes online and the push service can deliver the messages. Dispatcher API 344 may also define how the push notifications are queued and include priority rules. Dispatcher API 344 may also append information to the message created by content assembly module 342. For example, dispatcher API 344 may include a time-to-live for a push notification, the urgency of the message (for example, non-urgent messages may be not displayed if client device 150 is in a saving battery mode), append client information, and/or a push message with a "topic" name, which will replace any pending message with this new message.

Message memory 350 may include one or more storage devices configured to store instructions used by message processor 340 to perform operations related to the disclosed embodiments. For example, message memory 350 may store software instructions, such as messaging programs 352, that may perform operations when executed by message processor 340. In addition, message memory 350 may include push notifications, emails, and SMS templates that may be called based on user preferences. For example, message memory 350 may include templates for Android operating system and iOS operating systems. Depending on user account information, message processor 340 may retrieve different templates for the devices with different operating systems. Further, message data 354 may include logs of dispatched notifications, generated URIs, and notification service requirements.

In certain embodiments, message memory 350 may store sets of instructions for carrying out processes to generate and transmit the enhanced push notifications for credit card declines. For example, service system 105 may execute processes stored in message memory 350 using information from databases 180 and/or data from transaction manager 110.

Figure 4:
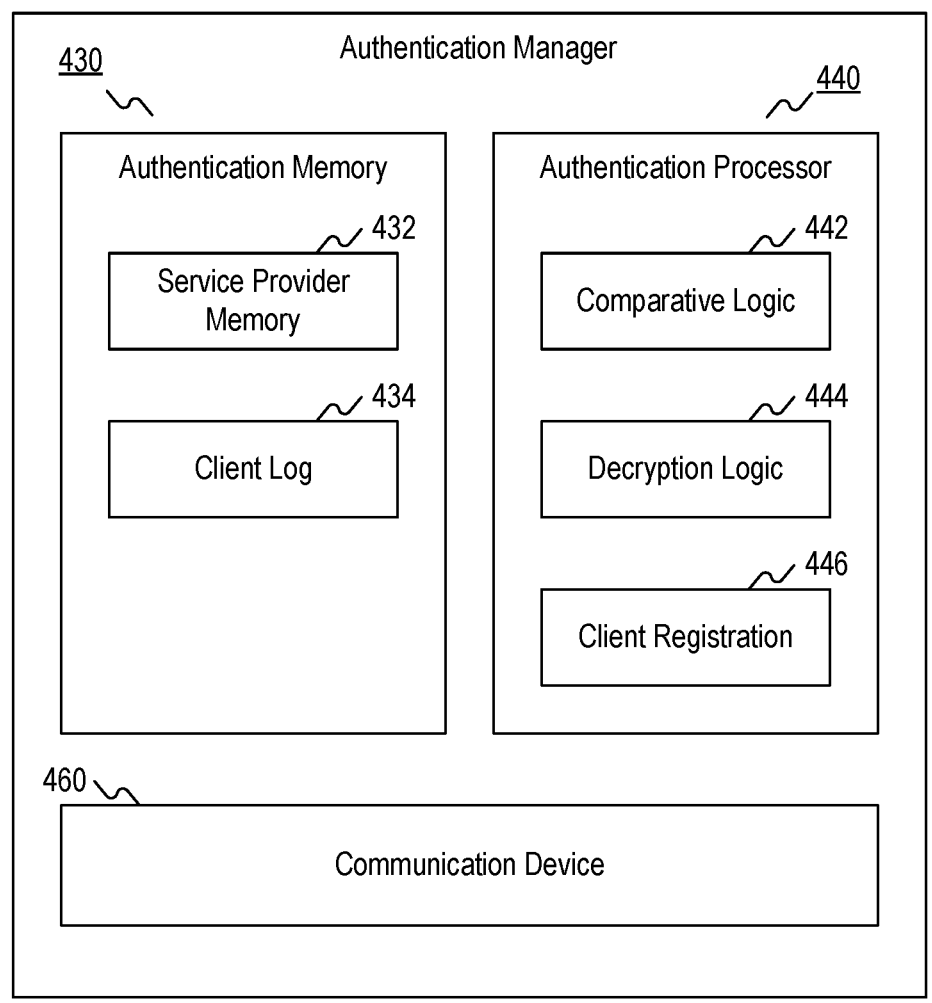
FIG. 4 is a block diagram of an exemplary authentication server, consistent with disclosed embodiments.

Referring now to FIG. 4, there is shown a block diagram of an exemplary authentication server 130 (FIG. 1), consistent with the disclosed embodiments. Authentication server 130 may include an authentication memory 430, an authentication processor 440, and a communication device 460. In some embodiments, authentication server 130 may be configured to communicate with messaging server 120 to identify the validity of user credentials.

The difficulties of performing authentication steps in client device 150, particularly in time-sensitive situations, may be alleviated by using push notifications and transferring some of the authentication steps to authentication server 130. In some embodiments, authentication server 130 may use password/user combinations to authorize users. Alternatively, or additionally, authentication server 130 may use biometric data. In such embodiments, client devices 150 may include a biometric sensor, as further described in connection with FIG. 10, and authentication server 130 may store biometric information. Further, in some embodiments, authentication server 130 may perform cryptographic functions to decrypt private and/or public keys, and verify that the user has been successfully authenticated.

Authentication memory 430 may include one or more storage devices configured to store instructions for handling user requests, user information, credentials information, and/or identification information of client devices 150. Authentication memory 430 may include client logs 434, which may record interactions between client devices 150, third-party systems 160, and service system 105. In addition, authentication memory 430 may include a service provider memory 432, which may include information about user accounts. For example, service provider memory 432 may include databases including user preferences that may determine whether or not the user has opted in to use biometric authentication. Additionally, or alternatively, service provider memory 432 may include user account information, such as available balance or credit, or user-generated account locks.

Authentication memory 430 may include storage devices storing instructions used by authentication processor 440 to perform functions related to the disclosed embodiments. For example, authentication memory 430 may store software instructions that may perform one or more operations when executed by authentication processor 440. In addition, authentication memory 430 may store user records of account history and normal patterns to identify potential fraud.

Authentication processor 440 may be embodied as a processor similar to transaction processors 230. Authentication processor 440 processor may include comparative logic 442, decryption logic 444, and a client registration 446.

Comparative logic 442 may be implemented with hardware or software to compare credentials received from client devices 150, such as passwords or biometric data received from client devices 150, with information associated with the particular user account. For example, a user account may be associated with a client device 150 associated with a specific MAC address. Then, comparative logic 442 may compare two MAC address templates to identify client devices 150. In other embodiments, comparative logic 442 may include a feature extraction that generates a normalized data file from client requests to more efficiently determine if client device 150 can be authenticated. In such embodiments, a template stored in authentication server 130, for example in authentication memory 430, may be compared with extracted features of client devices 150.

Decryption logic 444 may perform decryption algorithms based on validation policies to decrypt information and return the decrypted information to other elements of system 100, such as transaction manager 110. For example, the response from client devices 150 may be encrypted. In such embodiments, once a response is received from client devices 150, decryption logic 444 may decrypt the information and transmit it to transaction manager 110 to finalize a transaction. In some embodiments, decryption logic 444 may use one or more of the partner's key(s), a user's private key, public keys, as well as the partner's public key to safely communicate with the other parts of system 100.

Client registration 446 may perform instructions to determine whether the user has enabled device-level authentication and is enrolled in the notifications program. Client registration 446 may also determine if the user account has provided user preferences and may store user preferences when communicated via, for example, transaction manager 110. Client registration 446 may also update entries in databases 180 and may generate public/private key pairs for the newly registered users that enroll in push notifications. In some embodiments, client registration 446 may certify the key using other servers or a certification authority. For example, client registration 446 may communicate with an external certification authority, such as VeriSign. In other embodiments, the certification authority may be an internal certification authority within the authentication server 130.

Figure 5:
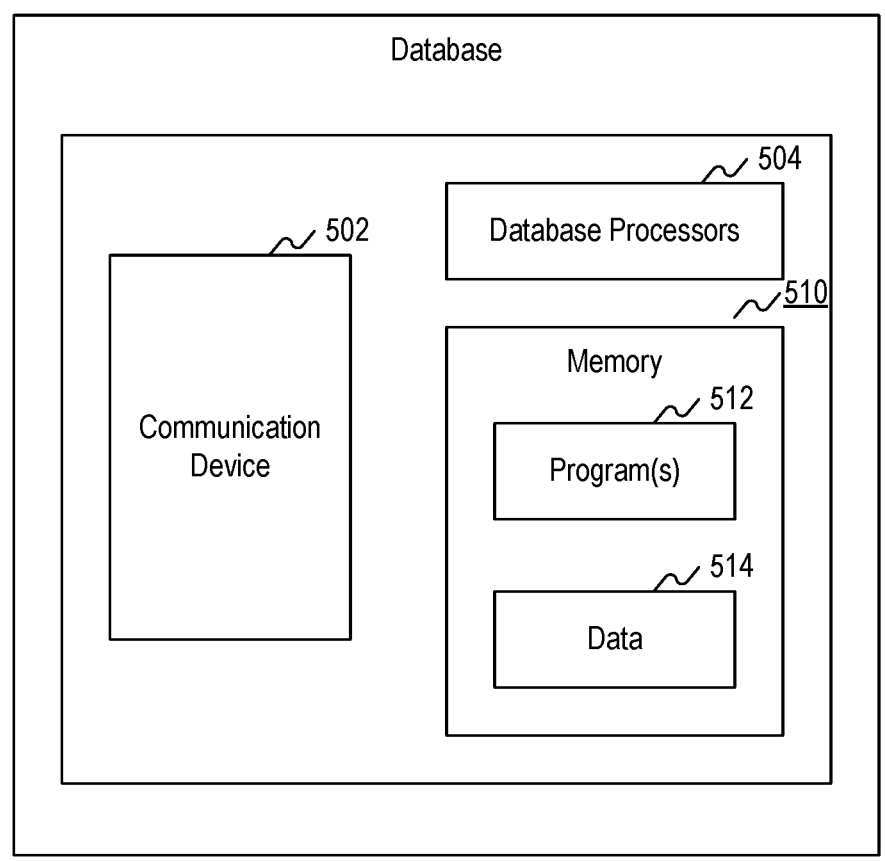
FIG. 5 is a block diagram of an exemplary database, consistent with disclosed embodiments.

Referring now to FIG. 5, there is shown a block diagram of an exemplary database 180 (FIG. 1), consistent with disclosed embodiments. Database 180 may include a communication device 502, one or more database processors 504, and a database memory 510 including one or more database programs 512 and data 514.

In some embodiments, databases 180 may take the form of servers, general-purpose computers, mainframe computers, or any combination of these components. Other implementations consistent with the disclosed embodiments are possible as well.

Communication device 502 may be configured to communicate with one or more components of system 100, such as online resources 140, service system 105, messaging server 120, authentication server 130, and/or client devices 150. In particular, communication device 502 may be configured to provide to messaging server 120 and transaction manager 110 user account information and/or user preferences.

Communication device 502 may be configured to communicate with other components as well, including, for example, message memory 350 (FIG. 3). Communication device 502 may take any of the forms described above for communication device 210 (FIG. 2).

Database processors 504, database memory 510, database programs 512, and data 514 may take any of the forms described above for transaction processors 230, transaction memory 220, transaction programs 222, and transaction data 224, respectively, in connection with FIG. 2. The components of databases 180 may be implemented in hardware, software, or a combination of both hardware and software. For example, although one or more components of databases 180 may be implemented as a computer executing instruction modules, all or a portion of the functionality of databases 180 may be implemented instead in dedicated hardware circuitry.

Data 514 may be data associated with websites, such as online resources 140, or user accounts from client devices 150. Data 514 may include, for example, information relating to websites, or information about merchants that receive credit cards.

Figure 6:
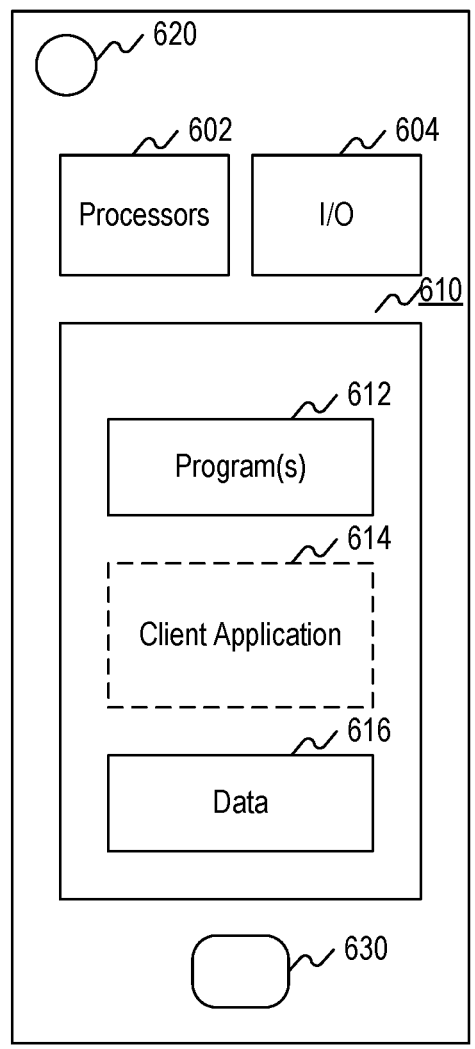
FIG. 6 is a block diagram of an exemplary client device, consistent with disclosed embodiments.

Referring now to FIG. 6, there is shown a block diagram of an exemplary client device 150 (FIG. 1), consistent with the disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general-purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may include web browsers, mobile applications, or similar software modules that access services consistent with the disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to the disclosed embodiments. For example, memory 610 may be configured with one or more software modules, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may include multiple programs. Memory 610 may also store data 616 that is used for processing push notifications. That is, memory 610 may include instructions to interpret and apply instructions in the payload of push notifications.

In certain embodiments, memory 610 may store instructions for displaying GUIs in client devices 150. In certain embodiments, instructions from messages from service system 105 may be executed by a client application 614. Moreover, in some embodiments, if client application 614 is not part of memory 610, client devices 150 may be unable to perform tasks instructed in the payload of push notifications and require other kind of messages, such as SMS or emails. Moreover, memory 610 may include information required to communicate with other elements of system 100. For example, memory 610 may include server addresses and instructions for communication with edge server 190. Further, client application 614 may be configured to perform automated operations, such as transmitting a decline message when a user does not act within a determined time threshold of receiving a push notification. Additional operations that may be executed by client devices 150 using client application 614 are further described below in connection with FIG. 9.

Moreover, other software components may be configured to request information from service system 105 or determine the location of client devices 150. For instance, these software instructions, when executed by processor(s) 602, may process information to display the status of a transaction.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (QR), or providing information to the user. I/O devices 604 may also include components for NFC communication. I/O devices 604 may also include one or more digital and/or analog devices that allow a user to interact with client devices 150, such as a touch-sensitive area, buttons, or microphones. I/O devices 604 may also include one or more accelerometers to detect the orientation and inertia of client devices 150. I/O devices 604 may also include other components known in the art for interacting with service system 105.

In some embodiments, client devices 150 may also include an imaging device, such as a camera 620, that captures images and facilitates biometric authentication processes, such as facial recognition. Additionally, or alternatively, client devices 150 may include a fingerprint sensor 630 that allows users to unlock client devices 150, make purchases, and/or perform authentications. Both camera 620 and fingerprint sensor 630 may be operated by processor 602 and use encryption security to make it impossible for users to externally access fingerprint or camera information.

Figure 7:
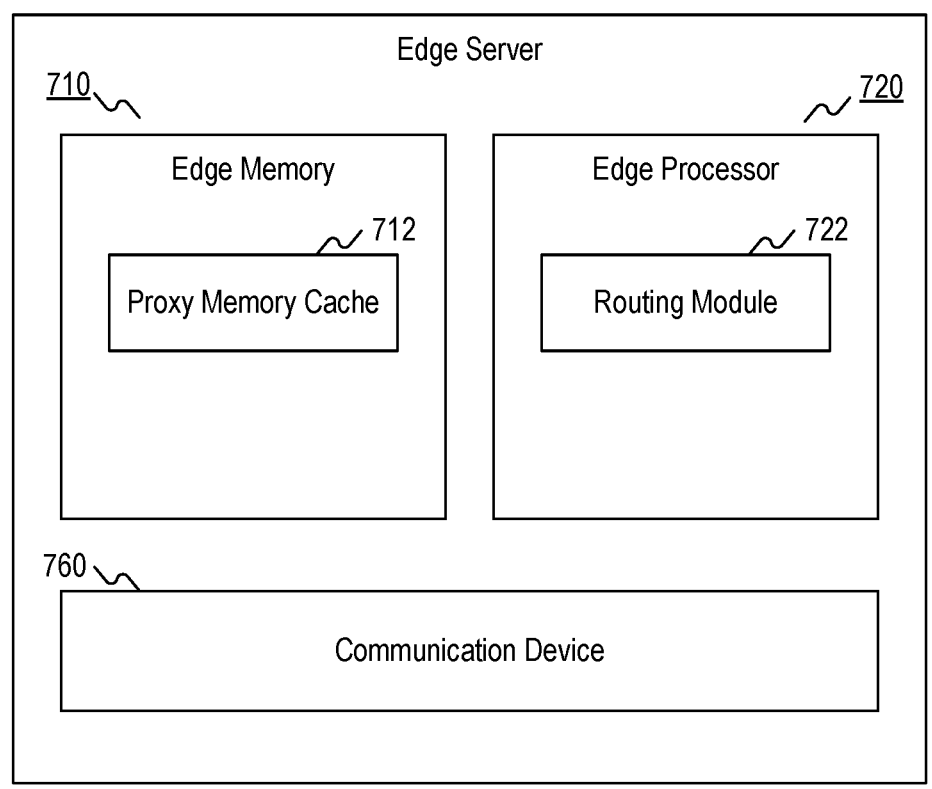
FIG. 7 is a block diagram of an exemplary edge server, consistent with disclosed embodiments.

Referring now to FIG. 7, there is shown a block diagram of an exemplary edge server 190 (FIG. 1), consistent with the disclosed embodiments. Edge server 190 may include an edge memory 710, an edge processor 720, and a communication device 760. In some embodiments, as shown in FIG. 1, edge server 190 may be coupled to client devices 150.

Edge processor 720 may be embodied as a processor similar to transaction processors 230. Edge processor 720 may include a routing module 722, which may perform instructions to relay messages to different elements of system 100. For example, routing module 722 may perform operations to identify one of client devices 150 and send messages to the selected client device 150. Further, routing module 722 may perform operations to transmit responses from client devices 150 to service system 105. Moreover, in some embodiments, edge processor 720 may be configured to generate basic notification processing. For example, edge server 190 may be configured to transmit indications of successful message delivery. Edge processor 720 may perform operations of transmitting and receiving acknowledgements of push notification receptions. Further, edge server 190 may perform operations to generate firewalls or implement security protocols, and may evaluate bandwidth utilization of communication device 760 to engage other servers when reaching limiting bandwidths.

Edge memory 710 may include one or more storage devices configured to store instructions used by edge processor 720 to perform operations related to disclosed embodiments. For example, edge memory 710 may store software instructions that may be executed by edge processor 720 to interface with client devices 150 and service system 105. In addition, edge memory 710 may include a proxy memory cache 712, which may include user account information or client logs. Edge memory 710 may also include a media cache controller (not shown) that may control and analyze the status and operation of edge server 190. Further, edge memory 710 may include identifying information of client devices 150.

Figure 8:
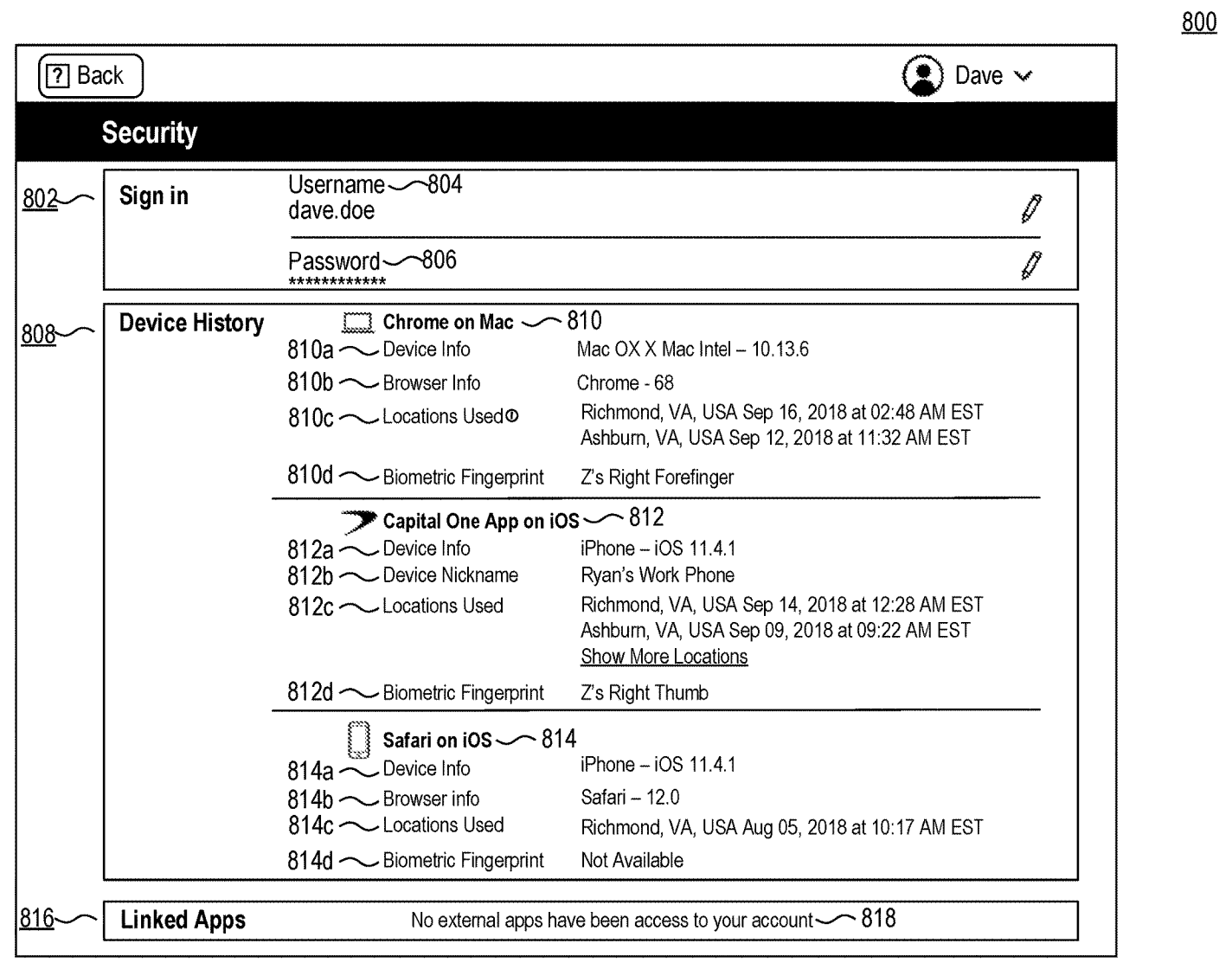

FIG. 8 depicts a graphical user interface (GUI) 800, consistent with the disclosed embodiments. As shown in FIG. 8, authentication server 130 may display GUI 800 to a user. GUI 800 may include a security settings window that includes a sign-in field 802, which includes a username field 804 and a password field 806. GUI 800 may include a device history window 808 displaying software/hardware configurations of client devices 150 used by a user. Device history window 808 may include device sections, such as a "Chrome on Mac" section 810, a "CapitalOne App on iOS" section 812, and a "Safari on iOS" section 814. "Chrome on Mac" section 810 may include device info 810a, browser info 810b, locations used 810c, and biometric fingerprint 810d. "CapitalOne App on iOS" section 812 may include device info 812a, device nickname 812b, locations used 812c, and biometric fingerprint 812d. "Safari on iOS" section 814 may include device info 814a, browser info 814b, locations used 814c, and biometric fingerprint 814d. GUI 800 may include a linked apps section 816 with a textual message 818 for display to a user.

Figure 9:
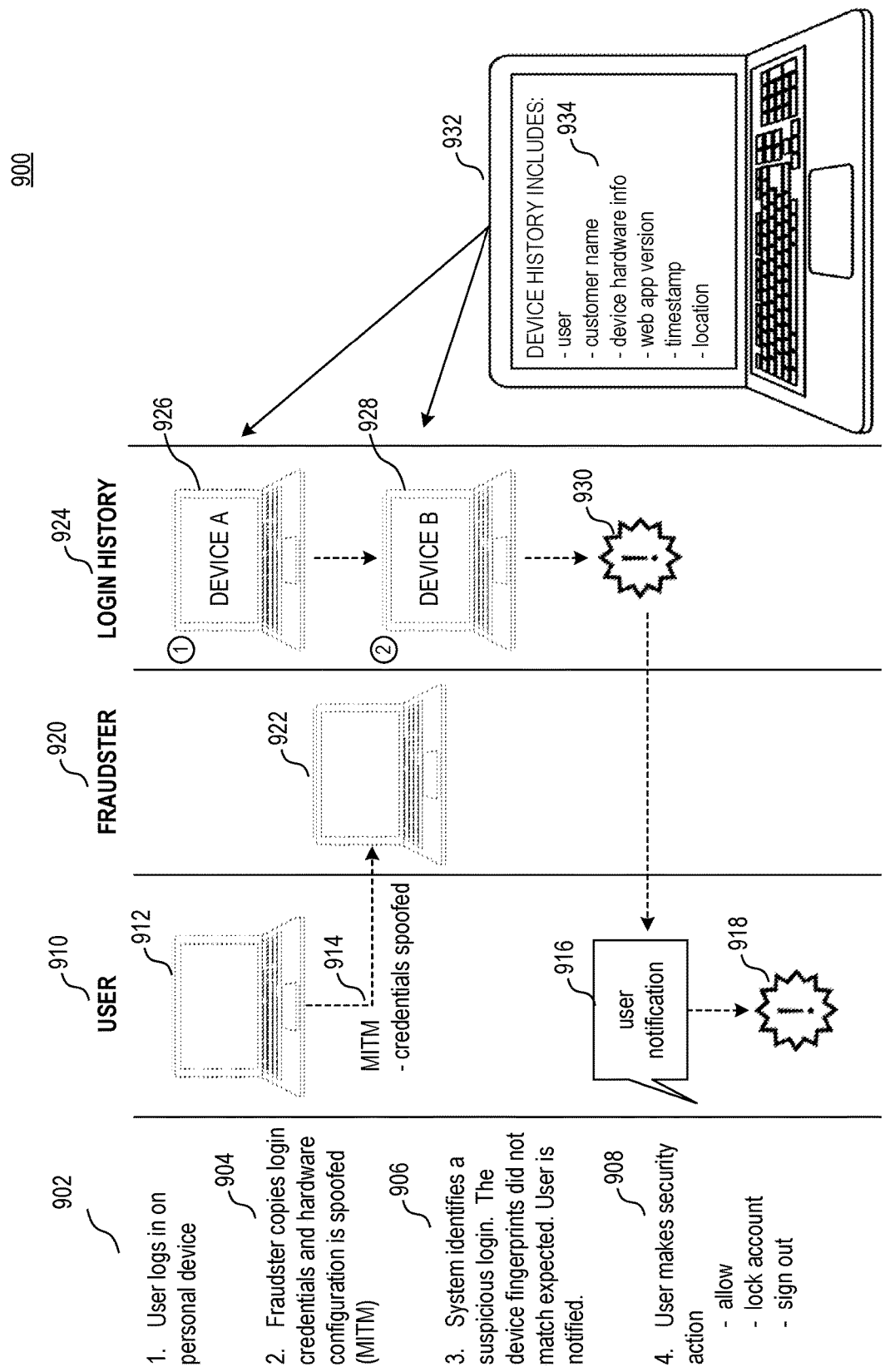
FIG. 9 depicts an example of a system response to a fraudster spoofing login credentials, consistent with disclosed embodiments.

FIG. 9 depicts an example of a system response to a fraudster 920 spoofing login credentials, consistent with the disclosed embodiments. At step 902, a user 910 may log into a personal device. At step 904, a fraudster 920 may copy login credentials, and the hardware configuration may be spoofed by a man-in-the-middle (MITM) or fraudster 920. At step 906, authentication server 130 may identify a suspicious login. As an example, the device "fingerprints" may or may not match as expected and user 910 may be notified. At step 908, user 910 may take an action, such as allowing the login to occur, locking an account, or signing out of his or her account. A device at step 912 may be spoofed with MITM credentials 914 to create a spoofed device 922, and a user notification 916 may be sent by authentication server 130 alerting user 910 at step 918 of the breach. Authentication server 130 may determine, based on login history 924, that two devices, such as device 926 and device 928, are different devices, and may send notification 930. A device history 932 including characteristics 934, such as user, customer name, device hardware info, web application version, timestamp, and location, may be contemplated.

Figure 10:
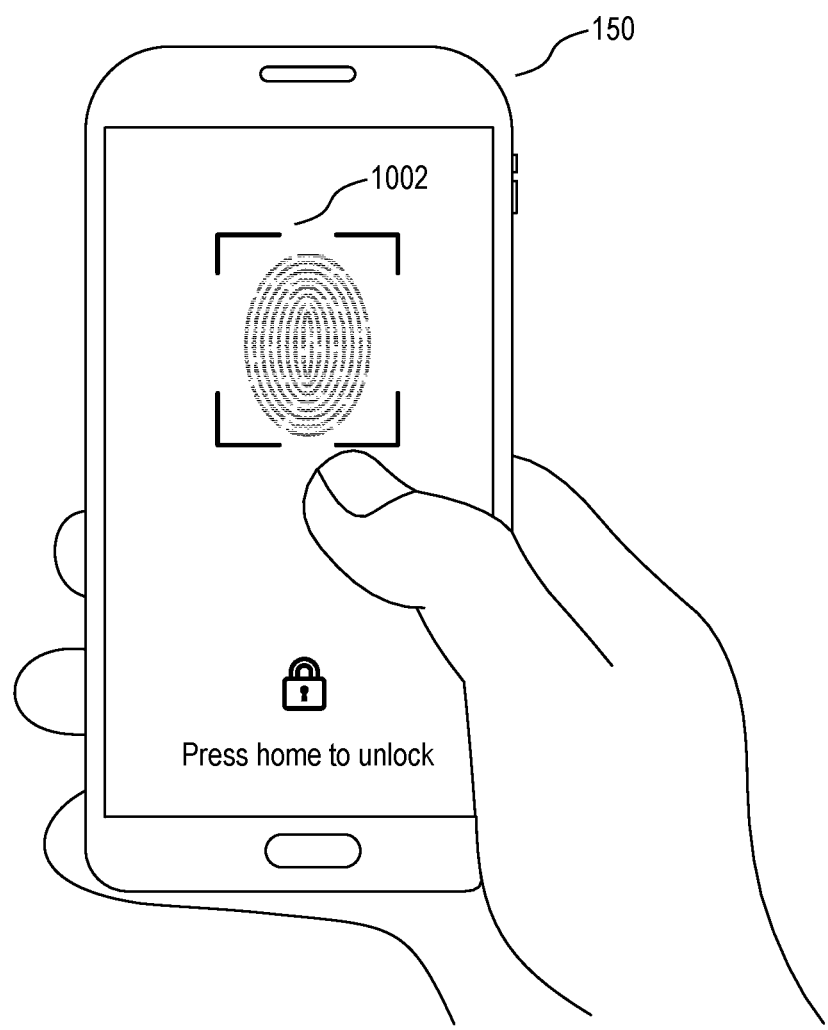
FIG. 10 depicts a diagram of a biometric fingerprint login on an electronic device, consistent with disclosed embodiments.

FIG. 10 depicts a diagram of a biometric fingerprint login on an electronic device, consistent with disclosed embodiments. As shown in FIG. 10, user device 150 may include a fingerprint sensor 1002 configured to be activated by a user's forefinger or thumb. Sensor 1002 generates a digital fingerprint signal from pressure of the user's forefinger or thumb that may compared with data stored in device 150 to facilitate login by the user to device 150. The digital fingerprint signal may also be used in combination with other device history characteristics 934 (FIG. 9) to provide security for user 910. Authentication server 130 may analyze the digital fingerprint signal in combination with other stored data to verify user logins consistent with this disclosure.

Figure 11:
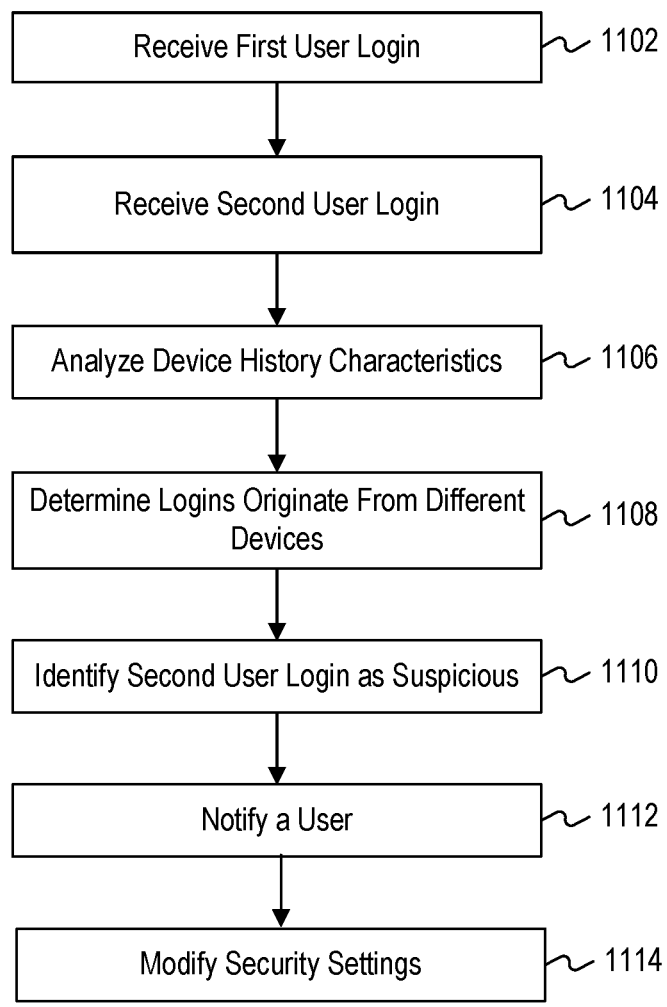
FIG. 11 depicts a flowchart of an exemplary process for identifying a suspicious login, consistent with disclosed embodiments.

Referring now to FIG. 11, there is shown a flow chart of an exemplary notification process 1100, consistent with the disclosed embodiments. In some embodiments, process 1100 may be executed by service system 105 (FIG. 1). For example, process 1100 may be performed by authentication server 130.

In step 1102, authentication server 130 may receive a first user login from an electronic device, the first user login comprising login credentials. As shown in FIG. 8, GUI 800 receives a sign-in field 802, which includes a username field 804 and a password field 806. Sign-in field 802 may display the first login credentials.

In step 1104, authentication server 130 may receive a second user login from an electronic device, the second user login comprising login credentials. As shown in FIG. 8, GUI 800 receives a sign-in field 802, which includes a username field 804 and a password field 806. Sign-in field 802 may display second login credentials.

In step 1106, authentication server 130 may determine and analyze a plurality of device history characteristics 934 (FIG. 9). Device history characteristics 934 may include at least one of a device name, a device location, a device timestamp, a device version, financial transaction metadata, a network mapping, or a stored digital fingerprint. Financial transaction metadata may include a date, time, or location where a financial transaction occurred or may also include a listing of users (or social media usernames) related to the user of an electronic device and that are located in close proximity to a financial transaction performed by or at the electronic device. Network mapping may include determining networks and/or nodes that an electronic device has connected to over a particular time period. Other device history characteristics may be contemplated. In one embodiment, for instance, the device history characteristics may comprise information associated with the last financial transaction performed by a particular electronic device (e.g., client device 150). This information may include account or vendor data (or other financial metadata type information such as date, time, or location where a last financial transaction occurred). Service system 105 may identify, based on the device history characteristics 934, the login credentials of the second user login as being a duplicate of the first user login. Service system 105 may also identify, based on device history characteristics 934, the hardware configuration of the electronic device of the second user login as being a duplicate of the hardware configuration of the electronic device of the first user login.

As shown in FIG. 8, authentication server 130 may display GUI 800 to user. GUI 800 may include a device history window 808. As shown in FIG. 8, device history window 808 may include a "Chrome on Mac" section 810, a "CapitalOne App on iOS" section 812, and a "Safari on iOS" section 814. "Chrome on Mac" section 810 may include device info 810a, browser info 810b, locations used 810c, and biometric data 810d, such as a digital fingerprint. "CapitalOne App on iOS" section 812 may include device info 812a, device nickname 812b, locations used 812c, and biometric data 812d. "Safari on iOS" section 814 may include device info 814a, browser info 814b, locations used 814c, and biometric data 814d. As shown in FIG. 10, user device 150 may receive a digital fingerprint signal from fingerprint sensor 1002 that may be used to login to user device 150. The digital fingerprint signal may be used by authentication server 130 in combination with other device history characteristics 934 (FIG. 9) to provide security for a user.

In step 1108, authentication server 130 may determine, based on the analysis, that the first and second user logins originate from different electronic devices. Service system 105 may determine, based on a predetermined confidence interval, that the first user login and the second user login originate from different electronic devices. As shown in FIG. 9, authentication server 130 may determine, based on login history 924, that two devices, such as device 926 and device 928, are different devices.

In step 1110, authentication server 130 may identify, based on the determination and the analysis, the second user login as a suspicious login. Authentication server 130 may identify, when an aggregation of the device history characteristics 934 (FIG. 9) fail to meet a predetermined confidence level, the second user login as a suspicious login. In this scenario, the second user may constitute a fraudster using spoofed credentials to login as a "second user login" at a later time.

In other embodiments, authentication server 130 may also identify, based on an aggregation of device history characteristics 934, a second login by a first user (i.e. the same user) as non-suspicious. In this scenario, authentication server 130 may identify a login to a credit card account by a first user at a home computer, and subsequently may identify another login a half-hour later from the same first user at a different device (e.g. smart phone). Consistent with this disclosure, in view an aggregation of the device history characteristics 934 surpassing a predetermined confidence level, the difference in the electronic devices notwithstanding (i.e. home PC versus smart phone), authentication server 130 still may not identify the first user's login at his or smart phone as suspicious. Instead, authentication server 130 may identify the first user's login at the smartphone as non-suspicious, precisely because of the accumulation of device history characteristics 934 (FIG. 9) surpassing a predetermined confidence level. In this case, the user name, customer name, location, and other characteristics for the first user may be the same between the home personal computer and the smartphone, leading to the aggregation of the device history characteristics 934 (FIG. 9) exceeding a confidence level threshold.

Alternatively, in the case when an aggregation of the device history characteristics 934 (FIG. 9) fail to meet a predetermined confidence level, due to a plurality of differences in user name, customer name, location, or other characteristics including different devices, authentication server 130 may identify the second user login as a suspicious login, and may reasonably identify a fraudster using spoofed credentials to login as a "second user login" at a different or later time.

Confidence levels or intervals may include a range of values defined such that there exists a probability threshold that indicates a value that lies within the range. For example, a 95% confidence interval results in 95% confidence (or probability) that the range of values contains or includes the data of the dataset. Consistent with the disclosed embodiments, 95% confidence intervals may be calculated, but other confidence interval values may be contemplated and calculated. Confidence intervals of 95% and other confidence intervals may be calculated and determined based on device history characteristics for different devices 926, 928.

In some embodiments, analysis from authentication server 130 may determine that there is a likelihood of login attempts originating from electronic devices 926, 928 that are connected through a Virtual Private Network (VPN). For example, authentication server 130 may recognize behavior that is not suspicious, and a login attempt associated with a first user (i.e. not a fraudster). This recognition by authentication server 130 may be built into a pre-determined confidence level associated with device history characteristics. In some aspects, other signals or other criteria may need to be analyzed by authentication server 130 in order to make a determination that the login attempt is suspicious, consistent with this disclosure. For example, in the case that the authentication server 130 determines that a location characteristic is abnormal or different compared to predetermined location characteristics, then authentication server 130 may identify the login as suspicious.

As another example, if a user has established a pattern of connecting to a network via a VPN with many different IP addresses, then a new subsequent login attempt from a new location may not seem unusual for authentication server 130 and a determination of suspicion may not be made (e.g. not suspicious). Similarly, if a user does not have an established pattern of attempting to login from multiple locations, then authentication server 130 may determine that the login is suspicious. Authentication server 130 may further perform a risk analysis that may consider many different signals or criteria, wherein the signals or criteria may include the IP address location of electronic devices 926, 928.

In some embodiments, authentication server 130 may further determine that the subsequent login attempts are originating from a fraudster. If there exist enough login attempts exceeding a predetermined threshold, authentication server 130 may lock a user account in order to protect, for example, a user's account information (e.g. bank or financial account information). VPN usage may also notify authentication server 130 that a login attempt is suspicious, as discussed below.

In step 1112, authentication server 130 may send to a user a notification of the identified suspicious login. Authentication server 130 may notify the user of the identified suspicious login by at least one of a text message or a graphical user interface (GUI) transmitted to the user. For example, as shown in FIG. 9, the device at 912 may be spoofed with MITM credentials 914 to create a spoofed device 922, and a user notification 916 may be sent by authentication server 130 alerting the user at step 918 of the breach.

In step 1114, authentication server 130 may modify, based on the notification, security settings on an account of the user. Authentication server 130 may lock an account of the user, end a session of the user, revoke a device authorization, or sign out of the electronic device of the first user login, based on the notification. For example, as shown in FIG. 9, at step 908, a user may take an action, such as allowing the login to occur, locking an account, or signing out of his or her account.

Another aspect of the disclosure is directed to a non-transitory, computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system for identifying suspicious logins, the system comprising:
a memory storing executable instructions;
at least one processor configured to execute the instructions to perform operations comprising:
receiving a first user login from an electronic device, the first user login comprising login credentials;
receiving a second user login from an electronic device, the second user login comprising login credentials;
identifying at least one second user login device characteristic;
analyzing a plurality of device history characteristics to establish an activity pattern, wherein:
the plurality of device history characteristics includes a network mapping and at least one first user login device history characteristic, and
the activity pattern comprises the submission of login credentials from a plurality of network addresses associated with a plurality of locations;
analyzing the plurality of device history characteristics to determine a confidence interval;
comparing the at least one second user login device characteristic to the activity pattern;
determining, based on the comparison and the confidence interval, that the first and second user logins originate from different electronic devices;
identifying, based on the plurality of device history characteristics, a hardware configuration of the electronic device of the second user login as being a duplicate of a hardware configuration of the electronic device of the first user login;
identifying, based on the determination, the second user login as a suspicious login;
sending, to a user, a notification of the identified suspicious login;
modifying, based on the notification, security settings on an account of the user; and
signing out of the electronic device of the first user login, based on the notification.

2. The system of claim 1, wherein the operations further comprise:
identifying, based on the plurality of device history characteristics, the login credentials of the second user login as being a duplicate of the login credentials of the first user login.

3. The system of claim 1, wherein the plurality of device history characteristics comprise at least one of a device name, a device location, a device timestamp, a device version, financial transaction metadata, a network address, or a stored electronic fingerprint.

4. The system of claim 1, wherein the operations further comprise:
identifying, when an aggregation of the plurality of device history characteristics fail to meet a predetermined confidence level, the second user login as a suspicious login.

5. The system of claim 1, wherein the operations further comprise:
notifying the user of the identified suspicious login by at least one of a text message or a graphical user interface (GUI) transmitted to the user.

6. The system of claim 1, wherein the operations further comprise at least one of:
locking the account of the user, ending a session of the user, or revoking a device authorization.

7. A method for identifying suspicious logins, the method comprising:
receiving a first user login from an electronic device, the first user login comprising login credentials;
receiving a second user login from an electronic device, the second user login comprising login credentials;
identifying at least one second user login device history characteristic;
analyzing a plurality of device history characteristics to establish an activity pattern, wherein:

the plurality of device history characteristics includes a network mapping and at least one first user login device history characteristic, and the activity pattern comprises the submission of login credentials from a plurality of network addresses associated with a plurality of locations;

analyzing the plurality of device history characteristics to determine a confidence interval;

comparing the at least one second user login device characteristic to the activity pattern;

determining, based on the comparison and the confidence interval, that the first and second user logins originate from different electronic devices;

identifying, based on the plurality of device history characteristics, a hardware configuration of the electronic device of the second user login as being a duplicate of a hardware configuration of the electronic device of the first user login;

identifying, based on the determination, the second user login as a suspicious login;

sending, to a user, a notification of the identified suspicious login;

modifying, based on the notification, security settings on an account of the user; and signing out of the electronic device of the first user login, based on the notification.

8. The method of claim 7, further comprising:
identifying, based on the plurality of device history characteristics, the login credentials of the second user login as being a duplicate of the login credentials of the first user login.

9. The method of claim 7, wherein the plurality of device history characteristics comprise at least one of a device name, a device location, a device timestamp, a device version, financial transaction metadata, a network address, or a stored electronic fingerprint.

10. The method of claim 7, further comprising:
identifying, when an aggregation of the plurality of device history characteristics fails to meet a predetermined confidence level, the second user login as a suspicious login.

11. The method of claim 7, further comprising:
locking the account of the user, ending a session of the user, or revoking a device authorization.

12. A non-transitory computer-readable medium storing instructions that, when executed by a processor, cause the processor to perform operations comprising:

receiving a first user login from an electronic device, the first user login comprising login credentials;

receiving a second user login from an electronic device, the second user login comprising login credentials;

identifying at least one second user login device history characteristic;

analyzing a plurality of device history characteristics to establish an activity pattern, wherein:
the plurality of device history characteristics includes a network mapping and at least one first user login device history characteristic, and the activity pattern comprises the submission of login credentials from a plurality of network addresses associated with a plurality of locations;

analyzing the plurality of device history characteristics to determine a confidence interval;

comparing the at least one second user login device characteristic to the activity pattern;

determining, based on the comparison and the confidence interval, that the first and second user logins originate from different electronic devices;

identifying, based on the plurality of device history characteristics, a hardware configuration of the electronic device of the second user login as being a duplicate of a hardware configuration of the electronic device of the first user login;

identifying, based on the determination, the second user login as a suspicious login;

sending, to a user, a notification of the identified suspicious login;

modifying, based on the notification, security settings on an account of the user; and signing out of the electronic device of the first user login, based on the notification.

13. The non-transitory computer-readable medium of claim 12, further comprising:
identifying, based on the plurality of device history characteristics, the login credentials of the second user login as being a duplicate of the login credentials of the first user login.

14. The non-transitory computer-readable medium of claim 12, wherein the plurality of device history characteristics comprise at least one of a device name, a device location, a device timestamp, a device version, financial transaction metadata, a network address, or a stored electronic fingerprint.

15. The system of claim 1, wherein the operations further comprise:
receiving, from a first user device, a first digital fingerprint signal; and receiving, from a second user device, a second digital fingerprint signal, wherein the first digital fingerprint signal is included in the at least one first user login device history characteristic and the second digital fingerprint signal is included in the at least one second user login device history characteristic.

16. The method of claim 7, further comprising:
notifying the user of the identified suspicious login by at least one of a text message or a graphical user interface (GUI) transmitted to the user.

17. The system of claim 5, wherein:
the operations further comprise notifying the user of the identified suspicious login by the GUI transmitted to the user, and the GUI comprises a security settings window including a username field and a password field.

18. The system of claim 17, wherein the GUI further comprises a device history window displaying at least one hardware configuration of the hardware configurations of the electronic device of the first user login and the hardware configuration of the electronic device of the second user login.

19. The non-transitory computer-readable medium of claim 12, further comprising:
notifying the user of the identified suspicious login by at least one of a text message or a graphical user interface (GUI) transmitted to the user.

* * * * *